United States Patent [19]

Fahn et al.

[11] 4,255,276

[45] Mar. 10, 1981

[54] SILICATIC COMPLEXING AGENT FOR ALKALINE EARTH IONS AND METHOD OF PREPARING SAME

[75] Inventors: Rudolf Fahn, Gammelsdorf; Nikolaus Fenderl, Moosburg, both of Fed. Rep. of Germany

[73] Assignee: Süd-Chemie Aktiengesellschaft, Munich, Fed. Rep. of Germany

[21] Appl. No.: 915,626

[22] Filed: Jun. 14, 1978

[30] Foreign Application Priority Data

Jun. 15, 1977 [DE] Fed. Rep. of Germany ....... 2727053

[51] Int. Cl.³ .................... C02B 1/16; C01B 31/16; C02B 1/40; C09K 3/32
[52] U.S. Cl. .................... 252/184; 210/684; 210/687; 252/179; 252/455 Z; 252/457; 423/112; 423/118
[58] Field of Search ............... 252/184, 179, 455 Z, 252/457; 210/37 B, 38 A; 423/112, 118, 328

[56] References Cited

U.S. PATENT DOCUMENTS

| | | |
|---|---|---|
| 3,326,632 | 6/1967 | Hashizume ............ 423/118 |
| 3,431,218 | 3/1969 | Plank et al. ............ 423/118 |
| 3,725,528 | 4/1973 | Banin ............ 423/118 |
| 3,927,171 | 12/1975 | Rollmann ............ 423/118 |
| 4,089,929 | 5/1978 | Christophliemk et al. ......... 423/118 |

*Primary Examiner*—Benjamin R. Padgett
*Assistant Examiner*—Irwin Gluck
*Attorney, Agent, or Firm*—Sprung, Felfe, Horn, Lynch & Kramer

[57] ABSTRACT

A silicatic complexing agent for alkaline earth ions comprising an acid activated mineral of the montmorillonite-beidellite series, said mineral charged with an alkali metal.

16 Claims, No Drawings

SILICATIC COMPLEXING AGENT FOR ALKALINE EARTH IONS AND METHOD OF PREPARING SAME

BACKGROUND OF THE INVENTION

1. Field of the Invention

This invention relates to an adsorptively acting silicatic complexing agent for alkaline earth metal ions as well as a method of producing the same. This invention is particularly concerned with such an adsorptively acting silicating complexing agent which not only has a high surface area and is characterized by a number of micropores, but also has a high ion exchange capacity.

2. Discussion of the Prior Art

It is known that clay minerals of the montmorillonite-beidellite series are natural cation exchangers and as such are capable of binding alkaline earth ions and heavy metal ions. For example, natural bentonite has an ion exchange capacity of about 80 to 100 mval per 100 grams. The ion exchange is based on an electronegative excess charge on the stratified silicate montmorillonite, the chief component of the bentonites. By the natural isomorphic replacement of, for example, trivalent aluminum ions in the octahedral layer with bivalent, usually magnesium ions, or also of tetravalent silicon ions with trivalent aluminum ions, for example, in the tetrahedral layer, an electropositive deficit of charge results in the silicate laminae which is compensated by the binding of, for example, alkali ions or alkaline earth ions.

In the case of acid activated minerals from the montmorillonite-beidellite series, ions are dissolved out of the octahedral layer, the amount of the octahedral layer ions entering into solution and of the tetrahedral layer ions which are soluble in acid being able to vary, depending on the acid concentration, temperature, time and pressure. The specific surface area and the number of micropores increases, while the ion exchange capacity decreases.

In many applications, however, it is desirable for the good adsorption capacity provided in the high specific surface area to be combined with a good ion exchange capacity. This is generally the case whenever, in addition to the binding of cations, a binding or adsorption is desired of molecules which may be unpolar or polar to a greater or lesser degree. This involves, for example, dye molecules, colored polymerization products, protein substances, and impurities in fats and oils.

Other applications are waste waters containing fats, oils and other chemicals such as proteins, phenols, solvent residues, etc., in addition to cationic impurities. Similar problems are encountered in the laundry industry, where the alkaline earth ions contained as hardness formers in the wash water must be removed as well as the dirt and the particles of coloring matter and fats.

OBJECTS OF THE INVENTION

It is the object of the invention to provide a silicatic composition of matter which has on the one hand a good adsorptive capacity and on the other a good complexing capacity for alkaline earth ions.

SUMMARY OF THE INVENTION

In accordance with the present invention there is provided a silicatic complexing agent characterized by a high surface area and a high ion exchange capacity, which silicatic complexing agent is useful for complexing and/or adsorption of alkaline earth metal ions. The silicatic complexing agent comprises an acid activated mineral of the montmorillonite-beidellite series, which mineral is charged with an alkali metal.

In accordance with the present invention it has been discovered by acid treating a montmorillonite-beidellite mineral and treating the so acid treated material with an alkali metal, that the same has a high surface area and a good ion exchange capacity and is particularly useful in the treatment of hard waters containing calcium.

The minerals of the montomorillonite-beidellite series are further explained, for example, in "Ullmanns Enzyklopädie der technischen Chemie," Vol. 17, pages 539 to 594. This series includes montmorillonite (the chief mineral of the bentonites), hectorite, beidellite, saponite and nontronite.

In accordance with the invention, an acid activated bentonite is used preferably as the starting material, which is then charged with alkali. The preparation of acid activated bentonites is known. For activation, the starting material is treated preferably with a mineral acid, such as hydrochloric acid, sulfuric acid or nitric acid. It is also possible to use organic acids such as acetic acid. The acid treatment can be performed in a dilute suspension or by treating a plastic mass of clay with concentrated acid. One can perform the acid activation of the plastic clay in the gas phase, for example with hydrogen chloride or sulfur dioxide. After activation the material is washed either with water or with dilute acid, and dried.

Generally, the acid used for the activation has a normality of 0.5 to 10 N, preferably 1.5 to 5 N, when diluted with an aqueous suspension of the starting material and between 1 and 7 ml, preferably 2 to 4 ml are used per gram of mineral of the montmorillonite-beidellite series. The amount will depend upon the strength of the acid. Generally speaking, the acid treatment is effected at a temperature between 80° and 100° C., preferably between 90° and 98° C.

In accordance with the invention, an acid activated material having a silicon dioxide content of about 68 to 75 weight percent, an $Al_2O_3(+Fe_2O_3)$ content of about 15 to 20 weight percent, an alkaline earth-$(CaO+MgO)$ content of about 1 to 4 weight percent and an alkali-$(Na_2O+K_2O)$ content of about 1 to 2 weight percent, balance bound water, and having a specific surface area of about 200 to 350 square meters per gram, has been found to be especially suitable. The specific surface area is determined generally by the BET method.

It is especially preferred to employ an acid activated material having a particle size of not more than about 50 microns. Such a material can be obtained, for example, by removing the coarser particles larger than 50 microns, preferably those larger than about 15 to 20 microns, by treatment with a hydrocyclone. In this case, either the still unactivated starting material or the acid activated material can be subjected to the hydrocyclone treatment. Preferably, this treatment is performed with the acid-treated material, since in this manner a good separating effect is obtained even in the case of concentrated suspensions. The coarser particles that are separated are usually quartz, mica, feldspar, pyrite, and hematite particles which have a minimal adsorptive or ion binding capacity. In many applications, these coarse particles would be undesirable on account of their greater hardness. For example, if the complexing agents were to be used in the laundry industry, they would be more destructive to fibers.

For charging of the acid activated materials, an alkali hydroxide, carbonate, phosphate or borate is used preferentially. The charging is preferably performed by combining the acid activated material with the alkaline substance to form a dry mixture. It can also be performed by treatment in an aqueous suspension or paste at about 25° to 100° C.

The acid activated materials are treated with the charging agent such that the resultant material preferably has an amount of alkali metal thereon or therein in an amount between 10 and 50 weight percent, preferably 25 and 40 weight percent.

Depending upon the manner by which the treatment is effected, the alkali metal can be present in the form of the hydroxide or in the form of a salt, e.g., the carbonate, phosphate or borate. Alternatively, the same can be present in the form of the alkali metal oxide if the material is treated to convert the hydroxide or salt form. Where media is present to permit ion exchange, the alkali metal is present in the form of an ion which has been ion exchanged for components of the acid activated mineral.

Thus, the expression "charging with alkali" as used herein is to be understood in connection with the invention as referring to and including the exchange of the hydrogen ions on the surface and between the laminae as well as the reaction with the acid groups of the activated material. This term furthermore includes the adsorptive binding as well as the incorporation of the alkaline substance into the crystal lattice of the material.

The complexing agents of the invention can generally be described by the crude formula:

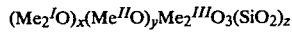

$(Me_2^IO)_x(Me^{II}O)_yMe_2^{III}O_3(SiO_2)_z$ wherein the symbols have the following meaning:
  $Me^I$ = sodium and potassium (the ratio $Na_2O:K_2O$ amounting preferably to about 10 to 100:1);
  $Me^{II}$ = magnesium and calcium (the ratio $MgO:CaO$ amounting preferably to about 0.5 to 3:1);
  $Me^{III}$ = aluminum and iron (the ratio $Al_2O_3:Fe_2O_3$ amounting preferably to about 3 to 6:1).
  x = 1.5 to 6, preferably 3 to 5
  y = D.2 to 1, preferably 0.3 to 0.5
  z = 6.2 to 8, preferably 7.5 to 8.

The complexing agent of the invention can also be in the form of an aqueous suspension. Such a suspension will contain about 100 to 200 g of insoluble solids per liter.

The complexing agents of the invention have, in a pH range from about 9 to 11, a calcium ion binding capacity between about 700 and 1000 mval/100 g, the binding capacity generally increasing at higher temperatures. The binding capacity of the complexing agents of the invention for calcium ions is thus about one power of ten greater than the ion exchange capacity of the natural bentonites of about 70 to 100 mval/100 g.

In order to more fully illustrate the nature of the invention and the manner of practicing the same, the following examples are presented:

EXAMPLE 1

Unburned bentonitic clay from the Bavarian deposits in the Moosburg-Mainburg-Landshut area is treated with 280 to 1680, preferably 840 mval of mineral acid, preferably hydrochloride acid, for each 100 g of dry clay, and heated for 5 to 10, preferably for 8 hours, at about 95° C. The components which dissolve are removed from the solid with the rest of the acid. After washing the acid activated bentonite to a pH of 4 to 5, the bentonite is dried and ground. The solid thus obtained is subjected to an alkali treatment, in which alkali compounds, such as hydroxides or carbonates, preferably $Na_2CO_3$, are added in amounts of about 20 to 50 parts by weight per 100 weight-parts of solid. If solid alkali compounds are used, they are ground together with the solid. If solutions of the alkali compounds are used, a concentrated solution is preferably kneaded into a past of the solid. This product is then dried and ground.

EXAMPLE 2

For the preparation of very finely divided silicatic complexing agents, the bentonite activated as in Example 1 is separated, after the heating operation, by a hydrocyclone treatment from accompanying minerals usually contained in bentonite, such as quartz, mica, feldspar, pyrite, etc. After removal of the coarse particles, the finely divided solid is separated from the suspension, washed, dried and ground and subjected to an alkali treatment as in Example 1. A product is obtained which is more productive with regard to its calcium binding capacity, since it contains lesser amounts of inactive substances than the product of Example 1.

EXAMPLE 3

A finely divided silicatic complexing agent similar to that of Example 2 is obtained when the solid separated in accordance with Example 1 from the rest of the acid is again suspended in water (approx. 200 g/l) and subjected to a hydrocyclone treatment. The solid content of the fines from the hydrocyclone treatment, 98% of whose particles are smaller than 20 microns, is separated, and the solid is dried as in Example 1, ground, and subjected to an alkali treatment as follows:
  3a: Ground together with 25 weight percent of ground anhydrous soda;
  3b: Ground together with 50 weight percent of ground anhydrous soda;
  3c: Kneaded with 20 weight percent of NaOH in aqueous suspension;
  3d: Kneaded with 40 weight percent of NaOH in aqueous suspension.

In the case of Examples 3c and 3d, the calculated amount of NaOH is prepared in the form of a 20% soda lye. The dry product is then kneaded into this solution. The resultant paste is dried at 80° C. and then ground.

Example of the Application 200 ml of water having a calcium hardness of 30° dh (German hardness standard; equal to 300 mg of CaO/liter) is heated in a 250 ml centrifuge tube, with stirring, at 90° C., 65° C., and 40° C., respectively. Then 0.2 g of the product of the invention is added and completely dispersed by stirring. The suspension is then adjusted to pH 10 and 0.5 N NaOH and stirred for 10 minutes. In some cases, liquid losses due to evaporation must be made up by the addition of distilled water. Then the solution is cooled to room temperature and centrifuged. The residual hardness of the supernatent clear solution is determined by complexometric calcium determination. The calcium binding capacity of the anhydrous active substance is computed in the following manner:

$$K = \frac{A - R}{S \times T}$$

K = Calcium binding capacity (mg CaO/g of active substance)
A = Starting concentration of the hard water used (300 mg CaO/l)
R = Residual content of centrifuged solution (mg CaO/l)

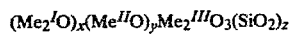

= 1 g/l

T = Dry substance content of the silicatic complexing agent (after drying at 105° to constancy of weight).

| Examples | Calcium Binding Capacity in mg CaO per g of active substance | Temp. ° C. |
|---|---|---|
| 3a | 271 | 90 |
| 3b | 289 | 90 |
| 3b | 274 | 65 |
| 3b | 276 | 40 |
| 3b | 259 | 20 |
| 3c | 221 | 90 |
| 3d | 249 | 90 |

We claim:

1. A silicatic complexing agent for alkaline earth metal ions consisting of an acid activated mineral of the montmorillonite-beidellite series, said mineral charged with an alkali metal.

2. A silicatic complexing agent for alkaline earth metal ions consisting essentially of an acid activated mineral of the montmorillonite-beidellite series, which mineral is charged with an alkali metal, said mineral having the formula $$(Me_2^I O)_x (Me^{II} O)_y Me_2^{III} O_3 (SiO_2)_z$$

wherein the symbols have the following meaning:
$Me^I$ is sodium and/or potassium
$Me^{II}$ is magnesium and calcium
$Me^{III}$ is aluminum and iron
x = 1.5 to 6
y = 0.2 to 1
z = 6.2 to 8.

3. A complexing agent according to claim 2 wherein said mineral of the montmorillonite-beidellite series is bentonite.

4. A complexing agent according to claim 2 wherein sodium and potassium are both present and the mol ratio of $Na_2O$ to $K_2O$ is about 10-100:1, the mol ratio of MgO to CaO is 0.5-3:1, the mol ratio of $Al_2O_3$ to $Fe_2O_3$ is 3-6:1, x = 3 to 5, y = 0.3 to 0.5, and z = 7.5 to 8.

5. A complexing agent according to claim 2 which is in the form of an aqueous suspension containing 100 to 200 grams per liter of insoluble solids.

6. A complexing agent according to claim 2 wherein said complexing agent at a pH of 9 to 11 has a calcium ion binding capacity of about 700 to 1,000 mval/100 g.

7. A complexing agent according to claim 2 which has about 1 power of 10 greater than the ion exchange capacity of a natural bentonite.

8. A complexing agent according to claim 6 wherein said complexing agent comprises 10 to 50 weight percent alkali metal.

9. A complexing agent according to claim 8 wherein said complexing agent contains 25 to 40 weight percent alkali metal.

10. A method for preparing a complexing agent which comprises subjecting an acid activated mineral of the montmorillonite-beidellite series to a hydrocyclone treatment so as to remove the coarse components about 15 to 20μ and charging the fine components of said acid activated mineral with a alkali metal hydroxide, carbonate, phosphate or borate.

11. A method according to claim 10 wherein the acid activated mineral is bentonite.

12. A method according to claim 10 wherein the acid activated mineral has a silica content of 68 to 74 weight percent, a combined alumina and $Fe_2O_3$ content of 15 to 20 weight percent, a combined alkaline earth metal oxide content of 1 to 4 weight percent, a combined alkali metal oxide content of 1 to 2 weight percent, the balance being water, said acid activated material having a specific surface area of approximately 200 to 350 m²/g.

13. A method according to claim 10 wherein the acid activated material which is treated with the alkali metal compound has a particle size of not more than 50 microns.

14. A process according to claim 10 wherein the process according to claim 11 wherein the process is carried out in the dry state.

15. A method according to claim 10 wherein the method is carried out by contacting the acid activated mineral with an aqueous solution of said alkali, hydroxide, carbonate, phosphate or borate.

16. A method according to claim 10 wherein the contacting of the acid activated mineral with the alkali metal compound is performed in aqueous suspension or as a paste at about 25° to 100° C.

* * * * *